(12) United States Patent
Jang et al.

(10) Patent No.: US 11,571,102 B2
(45) Date of Patent: *Feb. 7, 2023

(54) MOVING ROBOT AND METHOD OF CONTROLLING THE SAME

(71) Applicant: LG ELECTRONICS INC., Seoul (KR)

(72) Inventors: Jaewon Jang, Seoul (KR); Sungho Yoon, Seoul (KR); Jeongseop Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 854 days.

This patent is subject to a terminal disclaimer.

(21) Appl. No.: 16/478,884

(22) PCT Filed: Jan. 19, 2018

(86) PCT No.: PCT/KR2018/000895
§ 371 (c)(1),
(2) Date: Jul. 18, 2019

(87) PCT Pub. No.: WO2018/135900
PCT Pub. Date: Jul. 26, 2018

(65) Prior Publication Data
US 2019/0384306 A1   Dec. 19, 2019

(30) Foreign Application Priority Data

Jan. 19, 2017   (KR) .................. 10-2017-0009366

(51) Int. Cl.
*A47L 11/283* (2006.01)
*A47L 11/293* (2006.01)
(Continued)

(52) U.S. Cl.
CPC ............ *A47L 11/283* (2013.01); *A47L 9/009* (2013.01); *A47L 9/0606* (2013.01);
(Continued)

(58) Field of Classification Search
CPC ...... A47L 11/283; A47L 9/009; A47L 9/0606; A47L 9/2826; A47L 9/2852; A47L 11/14;
(Continued)

(56) References Cited

U.S. PATENT DOCUMENTS 10,758,103 B2 *   9/2020   Park .......................... A47L 9/28
2011/0153081 A1   6/2011   Romanov et al.
(Continued)

FOREIGN PATENT DOCUMENTS

EP   2 495 079   9/2012
EP   3 440 981   2/2019
(Continued)

OTHER PUBLICATIONS

International Search Report dated Jun. 15, 2018 issued in Application No. PCT/KR2018/000895.
(Continued)

*Primary Examiner* — David Redding
(74) *Attorney, Agent, or Firm* — Ked & Associates, LLP

(57) ABSTRACT

A method of controlling a moving robot is provided. The method of controlling a moving robot includes the steps of: (a) performing a basic motion of the moving robot which moves on a rotating mop; (b) measuring the slip rate of the moving robot; and (c) controlling the travel of the moving robot.

13 Claims, 9 Drawing Sheets

(51) Int. Cl.

| | |
|---|---|
| *A47L 11/14* | (2006.01) |
| *A47L 11/282* | (2006.01) |
| *A47L 11/292* | (2006.01) |
| *A47L 11/16* | (2006.01) |
| *B25J 9/16* | (2006.01) |
| *B25J 11/00* | (2006.01) |
| *G05D 1/02* | (2020.01) |
| *A47L 9/00* | (2006.01) |
| *A47L 11/20* | (2006.01) |
| *B25J 9/00* | (2006.01) |
| *B25J 9/12* | (2006.01) |
| *A47L 13/20* | (2006.01) |
| *B08B 3/04* | (2006.01) |
| *B08B 3/08* | (2006.01) |
| *A47L 11/40* | (2006.01) |
| *A47L 11/34* | (2006.01) |
| *A47L 9/06* | (2006.01) |
| *B25J 5/00* | (2006.01) |
| *B08B 1/04* | (2006.01) |
| *A47L 9/28* | (2006.01) |
| *A47L 11/24* | (2006.01) |
| *A47L 11/00* | (2006.01) |

(52) U.S. Cl.
CPC ........... *A47L 9/2826* (2013.01); *A47L 9/2852* (2013.01); *A47L 11/14* (2013.01); *A47L 11/16* (2013.01); *A47L 11/161* (2013.01); *A47L 11/20* (2013.01); *A47L 11/201* (2013.01); *A47L 11/24* (2013.01); *A47L 11/282* (2013.01); *A47L 11/292* (2013.01); *A47L 11/293* (2013.01); *A47L 11/34* (2013.01); *A47L 11/40* (2013.01); *A47L 11/4002* (2013.01); *A47L 11/4005* (2013.01); *A47L 11/405* (2013.01); *A47L 11/408* (2013.01); *A47L 11/4011* (2013.01); *A47L 11/4013* (2013.01); *A47L 11/4038* (2013.01); *A47L 11/4041* (2013.01); *A47L 11/4058* (2013.01); *A47L 11/4061* (2013.01); *A47L 11/4066* (2013.01); *A47L 11/4069* (2013.01); *A47L 11/4072* (2013.01); *A47L 11/4083* (2013.01); *A47L 11/4088* (2013.01); *A47L 13/20* (2013.01); *B08B 1/04* (2013.01); *B08B 3/041* (2013.01); *B08B 3/08* (2013.01); *B25J 5/007* (2013.01); *B25J 9/0003* (2013.01); *B25J 9/126* (2013.01); *B25J 9/1664* (2013.01); *B25J 9/1666* (2013.01); *B25J 11/0085* (2013.01); *G05D 1/0223* (2013.01); *A47L 11/00* (2013.01); *A47L 11/145* (2013.01); *A47L 2201/00* (2013.01); *A47L 2201/04* (2013.01); *A47L 2201/06* (2013.01); *B08B 2203/00* (2013.01); *G05D 2201/0203* (2013.01)

(58) Field of Classification Search
CPC ........ A47L 11/16; A47L 11/161; A47L 11/20; A47L 11/201; A47L 11/24; A47L 11/282; A47L 11/292; A47L 11/293; A47L 11/34; A47L 11/40; A47L 11/4002; A47L 11/4005; A47L 11/4011; A47L 11/4013; A47L 11/4038; A47L 11/4041; A47L 11/405; A47L 11/4058; A47L 11/4061; A47L 11/4066; A47L 11/4069; A47L 11/4072; A47L 11/408; A47L 11/4083; A47L 11/4088; A47L 13/20; A47L 11/00; A47L 11/145; A47L 2201/00; A47L 2201/04; A47L 2201/06; B08B 1/04; B08B 3/041; B08B 3/08; B08B 2203/00; B25J 5/007; B25J 9/0003; B25J 9/126; B25J 9/1664; B25J 9/1666; B25J 11/0085; G05D 1/0223; G05D 2201/0203
See application file for complete search history.

(56) References Cited

U.S. PATENT DOCUMENTS

| | | |
|---|---|---|
| 2012/0219207 A1 | 8/2012 | Shin et al. |
| 2015/0142169 A1 | 5/2015 | Kim et al. |

FOREIGN PATENT DOCUMENTS

| | | |
|---|---|---|
| KR | 10-2006-0032880 | 4/2006 |
| KR | 10-2011-0047505 | 5/2011 |
| KR | 10-2015-0057959 | 5/2015 |
| KR | 10-1523848 | 5/2015 |
| KR | 10-2016-0090569 | 8/2016 |

OTHER PUBLICATIONS

Taiwanese Office Action dated Dec. 28, 2018 issued in Application No. 107101905 (English translation attached).
European Search Report dated Oct. 21, 2020 issued in Application No. 18741070.9.

* cited by examiner

[Fig. 1]
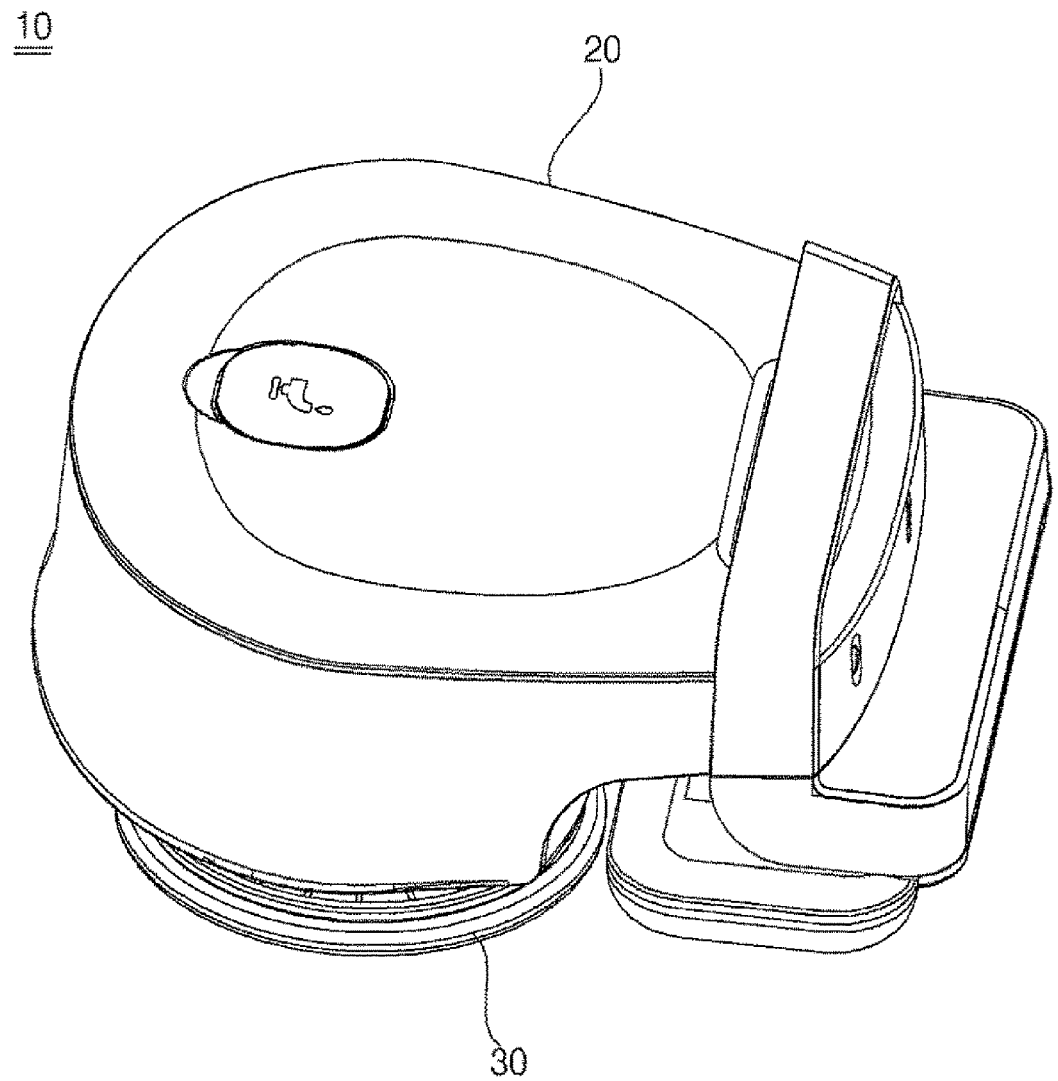
[Fig. 2]
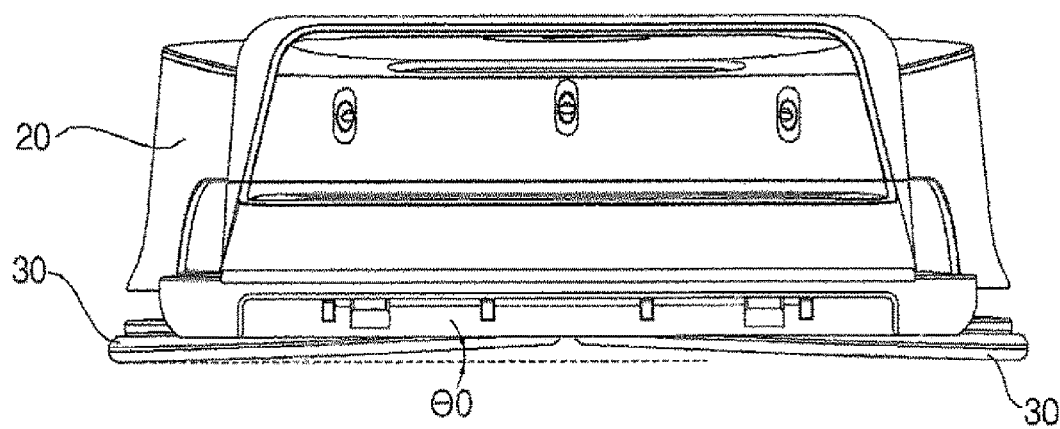

[Fig. 3a]
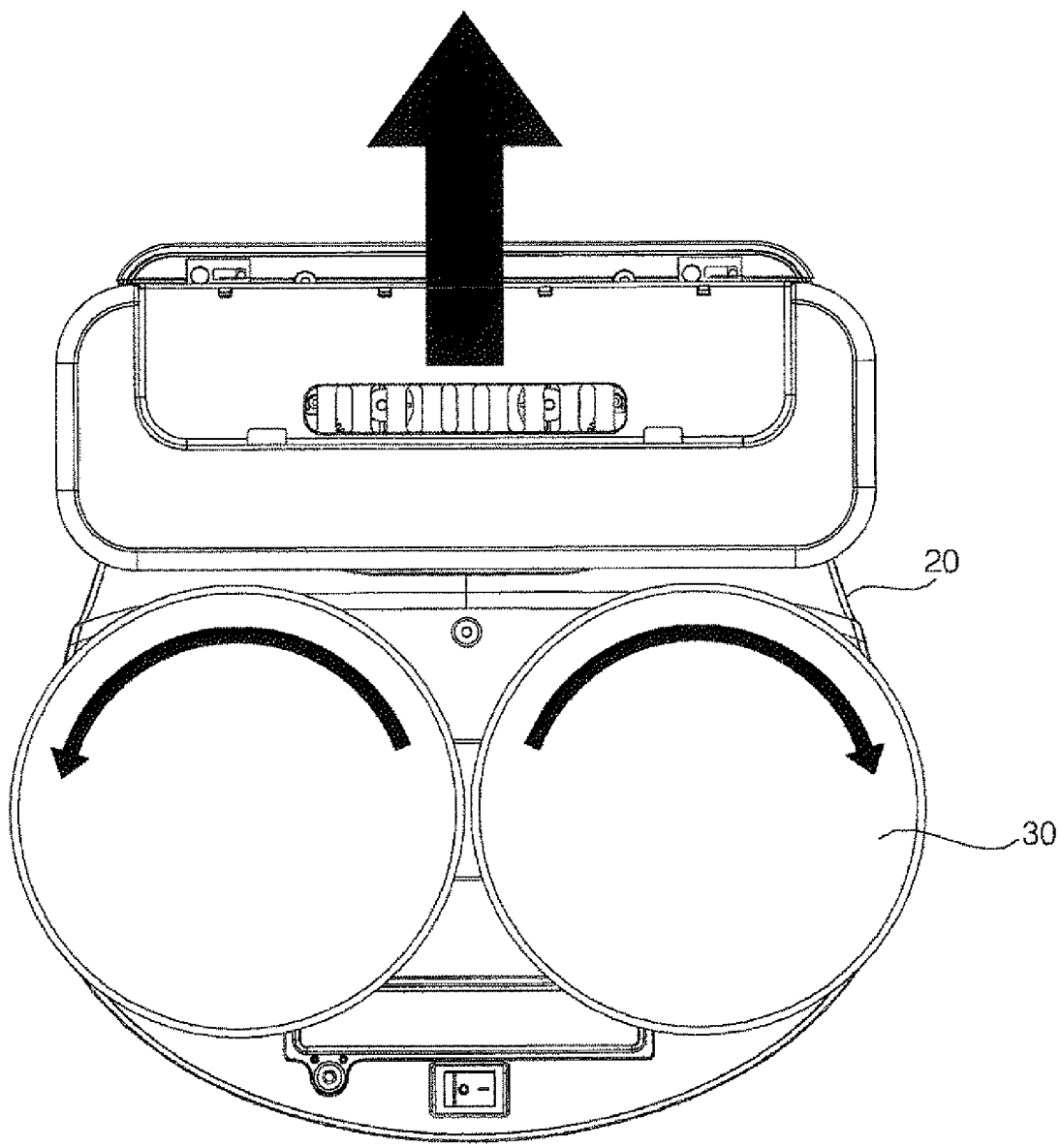

[Fig. 3b]
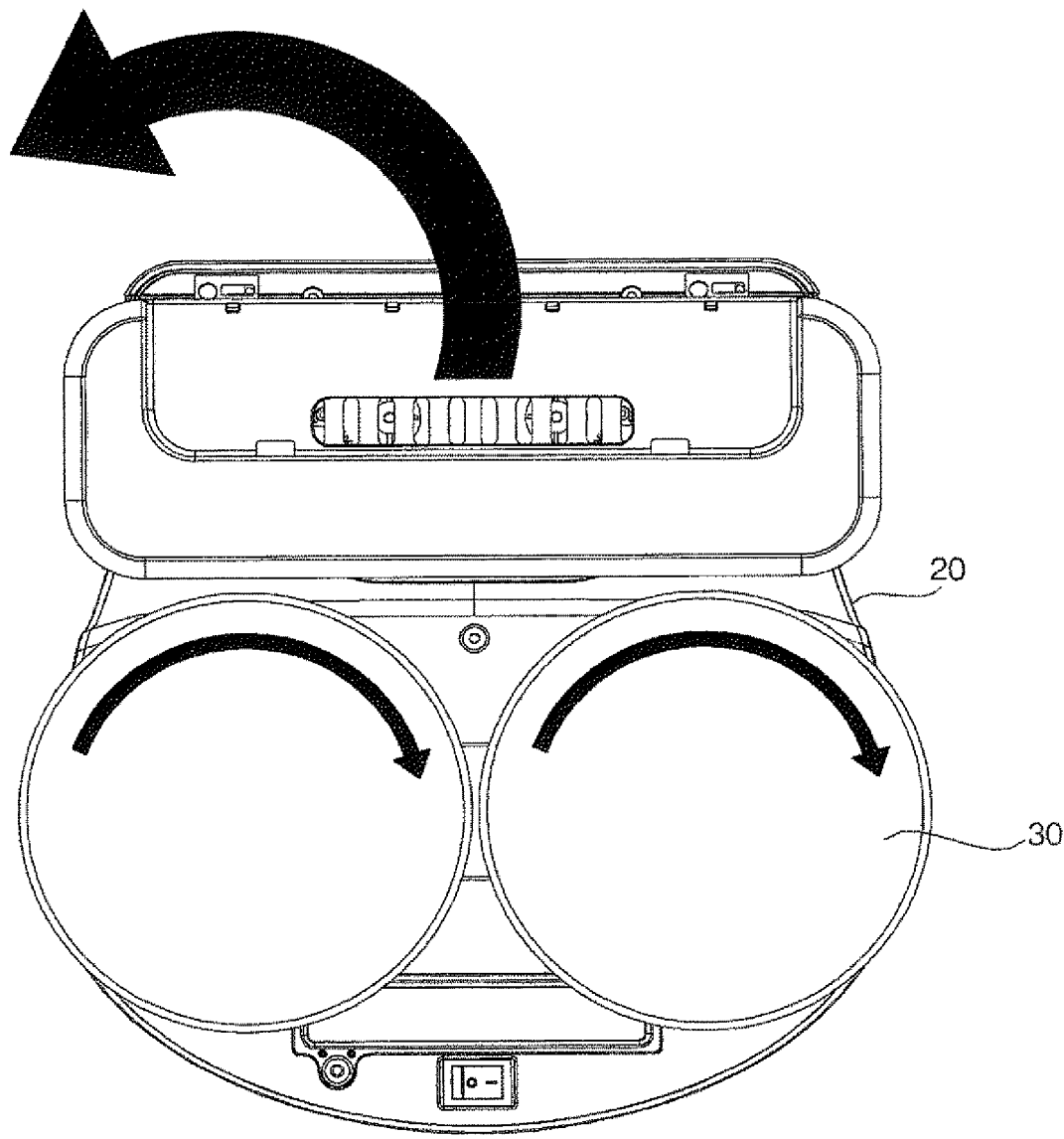

[Fig. 3c]
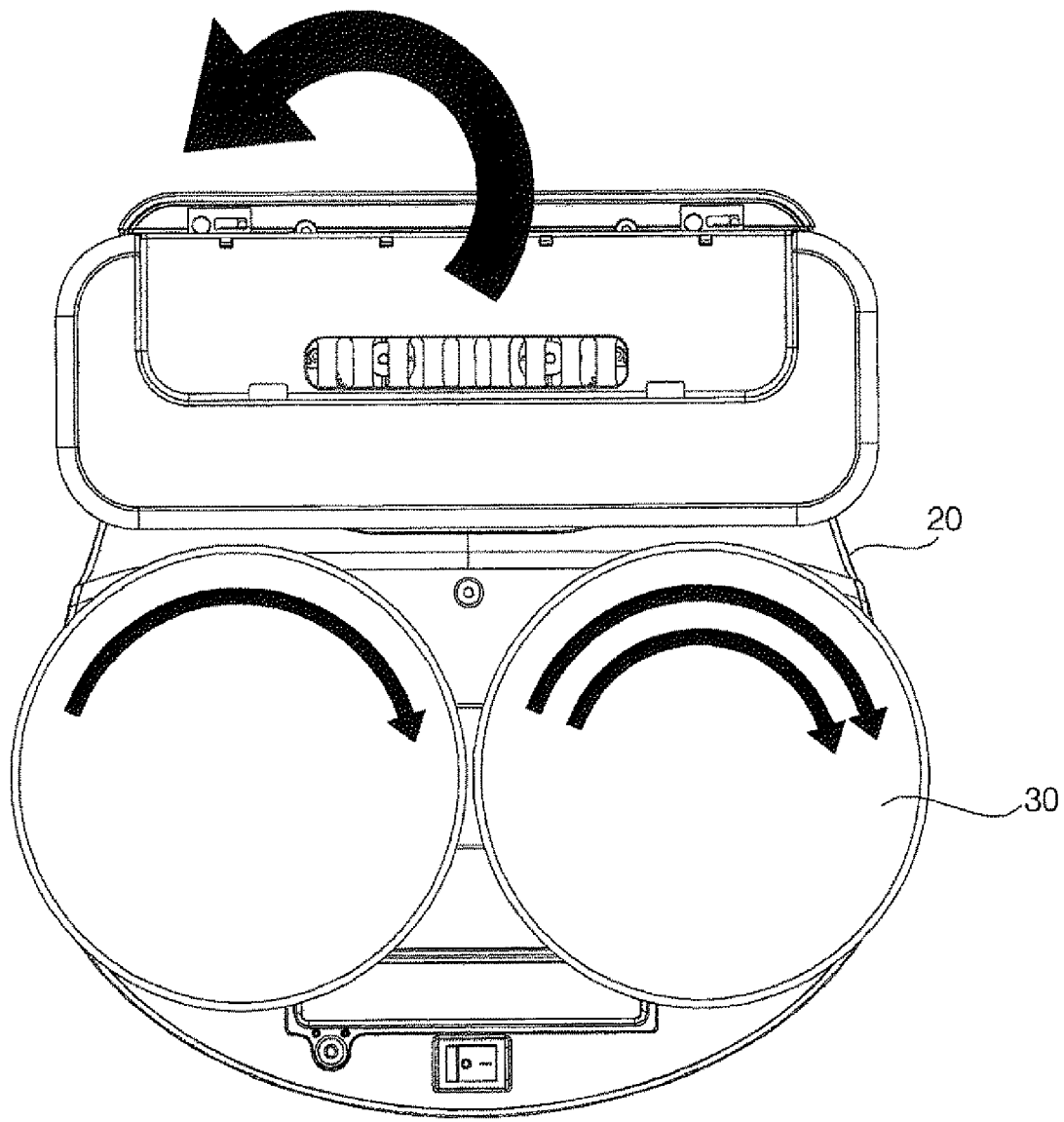

[Fig. 4]
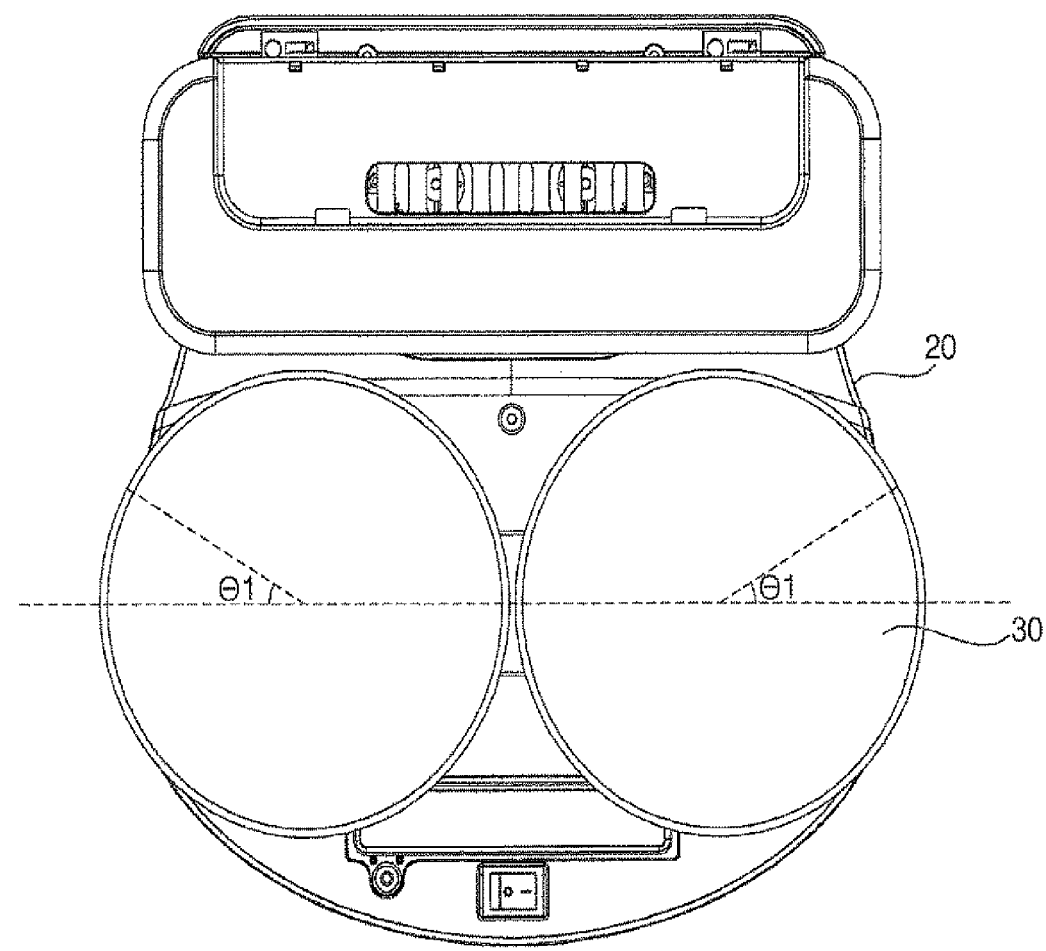

[Fig. 5]
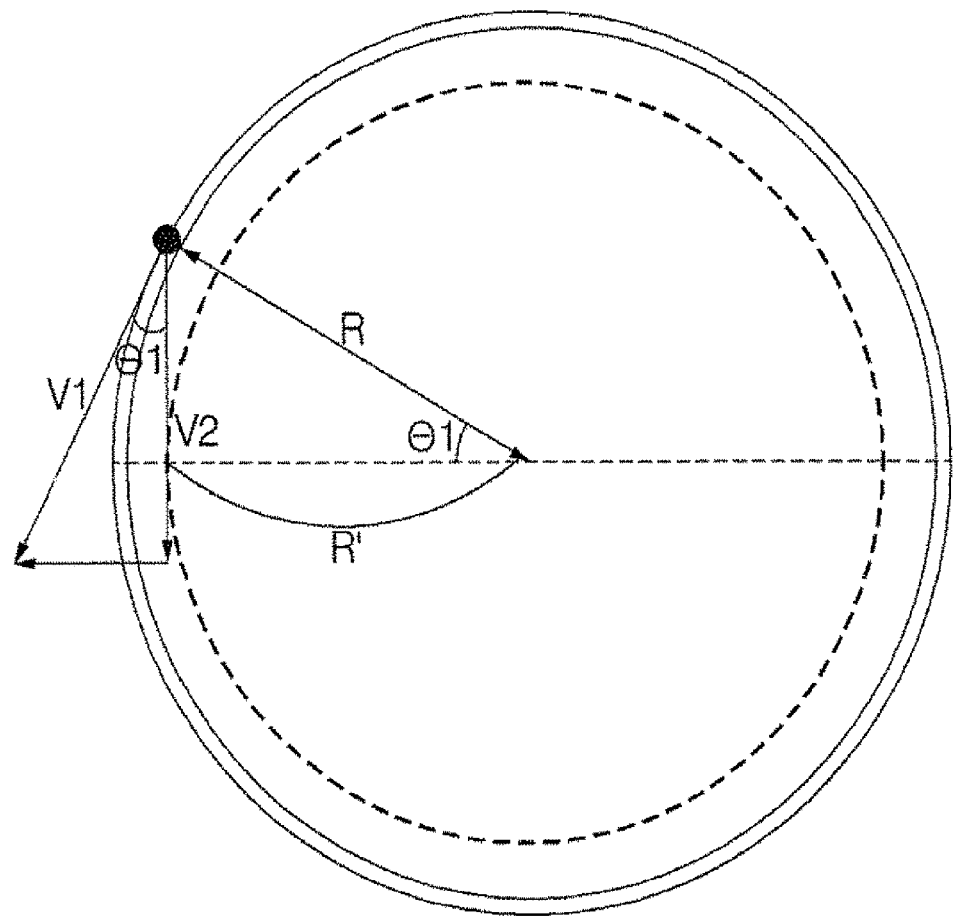
[Fig. 6]
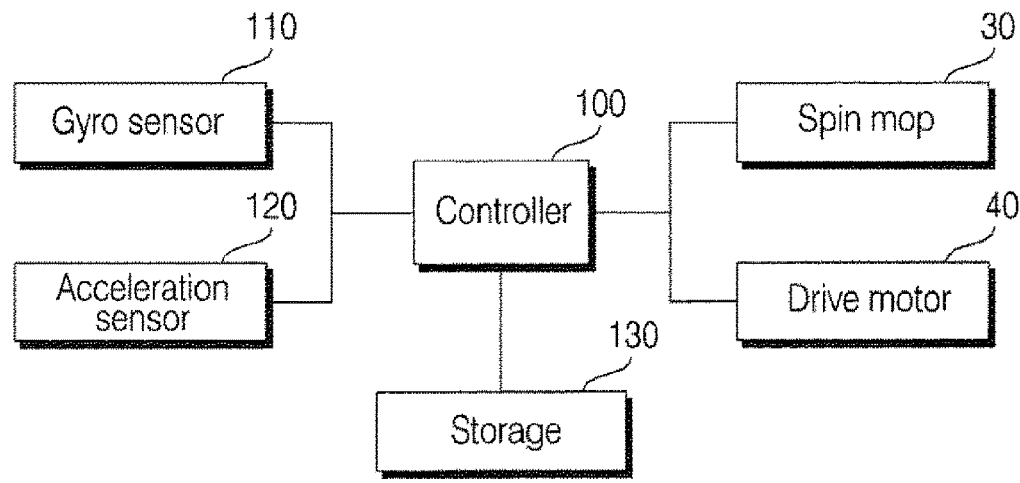

[Fig. 7]
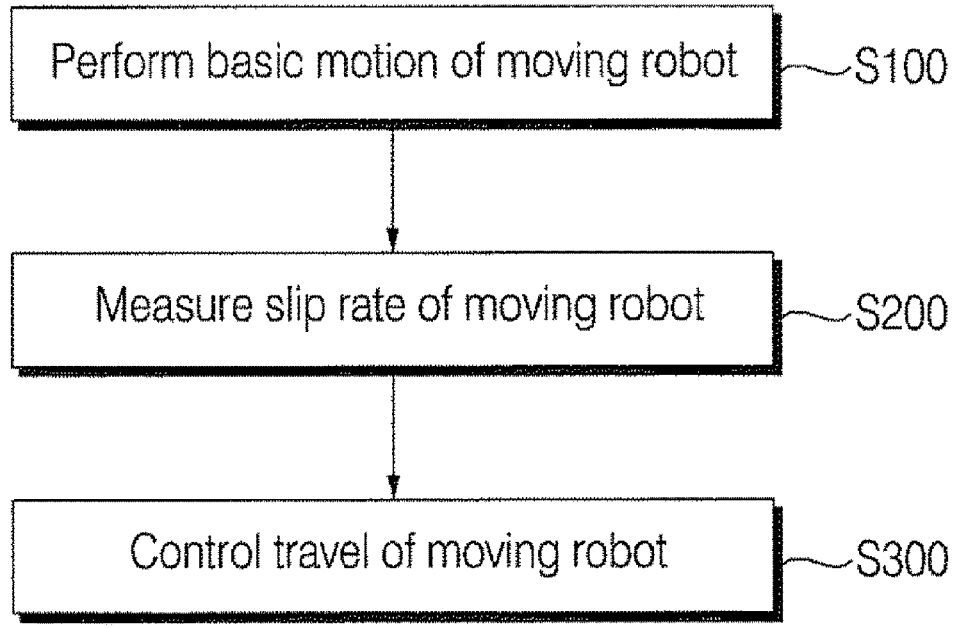
[Fig. 8]
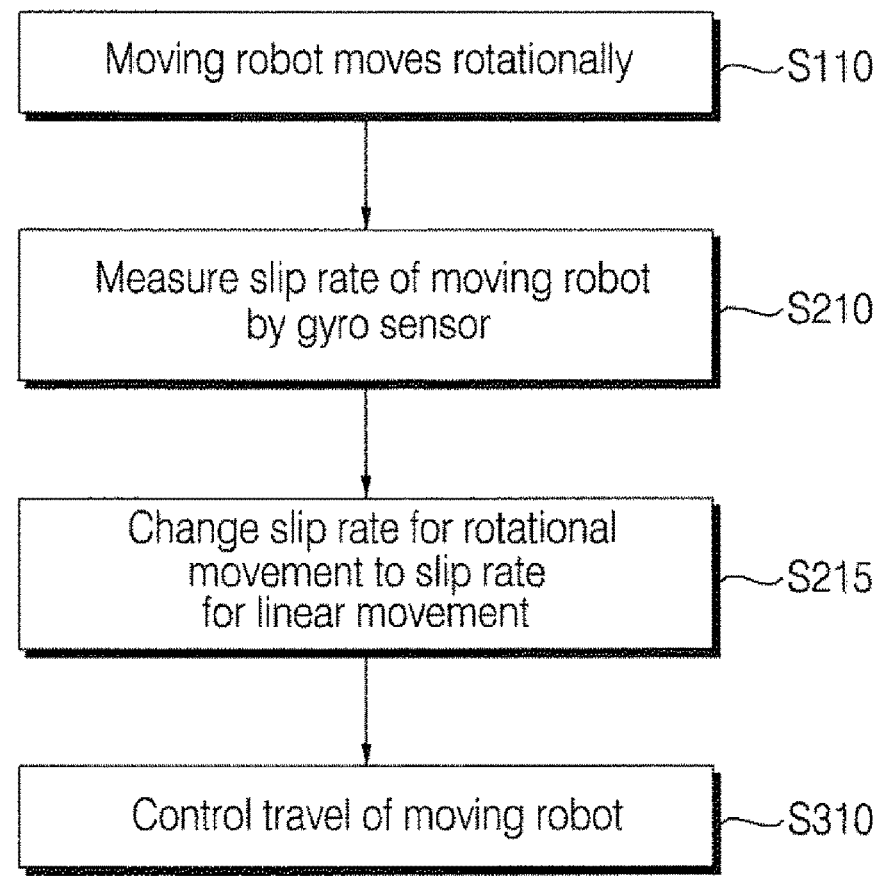

[Fig. 9]
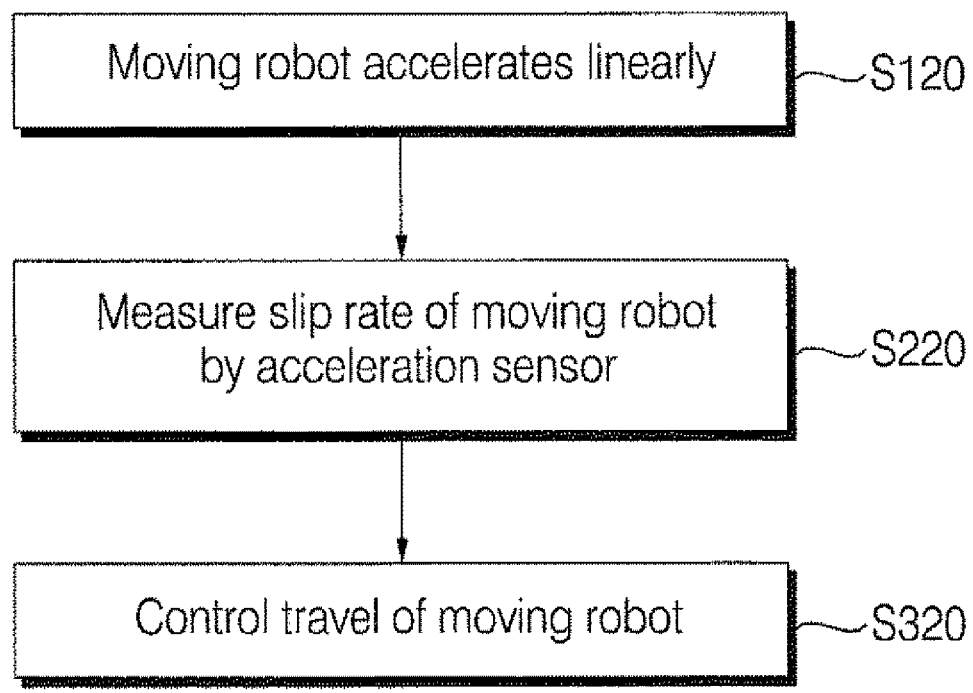

[Fig. 10]
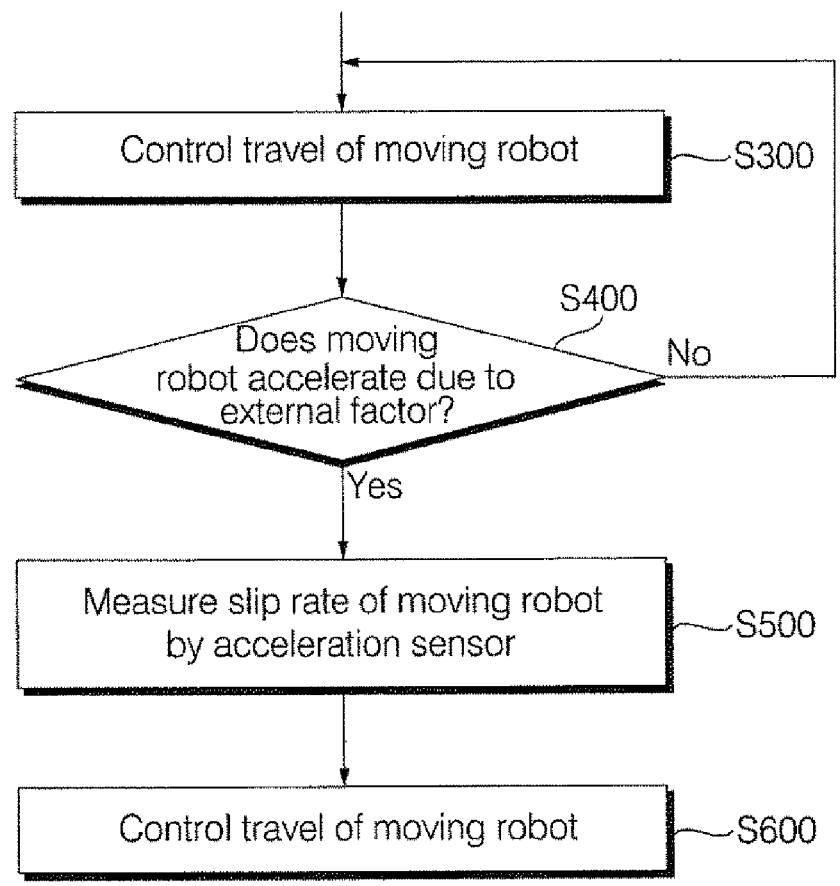

MOVING ROBOT AND METHOD OF CONTROLLING THE SAME

CROSS-REFERENCE TO RELATED PATENT APPLICATIONS

This application is a U.S. National Stage Application under 35 U.S.C. § 371 of PCT Application No. PCT/KR2018/000895, filed Jan. 19, 2018, which claims priority to Korean Patent Application No. 10-2017-0009366, filed Jan. 19, 2017, whose entire disclosures are hereby incorporated by reference.

TECHNICAL FIELD

The present invention relates to a moving robot and a method of controlling the same, and more particularly, to a method of controlling the travel of a moving robot that moves on a rotating mop.

BACKGROUND ART

Recently, robots are increasingly used in homes. A typical example of home robots is a cleaning robot. The cleaning robot is a mobile robot that automatically cleans a certain space by sucking up dust, dirt, and debris from the floor while traveling around the space by itself or by wiping up the floor with a rotating mop while moving on the rotating mop.

However, microfiber or fabric mops create little friction against the floor when the moving robot moves on the rotating mop, which leads to a shorter moving distance relative to the rotation of the rotating mop ? that is, slip.

Such a moving robot which moves on the rotting mop as a moving means may have difficulties traveling at a desired velocity or a desired distance due to slip.

Patent Registration No. KR1578879B1 discloses a moving robot for cleaning that moves on a rotating mop and cleans the floor, but it does not disclose a method of controlling the travel of the moving robot.

DISCLOSURE OF INVENTION

Technical Problem

The present invention provides a method of controlling a moving robot that controls travel by figuring out the slip rate of the moving robot.

The present invention also provides a method of controlling a moving robot that controls travel by figuring out the slip rate of the moving robot depending on the moving environment.

Solution to Problem

An exemplary embodiment of the present invention provides a method of controlling a moving robot, the method including the steps of: (a) performing a basic motion of the moving robot which moves on a rotating mop; (b) measuring the slip rate of the moving robot; and (c) controlling the travel of the moving robot. Therefore, the travel of the moving robot may be controlled by figuring out the slip rate of the moving robot.

In the step (a), the moving robot may move rotationally, and in the step (b), the moving robot may measure the slip rate of the moving robot by a gyro sensor for detecting the rotational velocity of the moving robot. Therefore, the slip rate may be figured out by the gyro sensor during rotational movement of the moving robot.

In the step (a), the moving robot may accelerate linearly, and, in the step (b), the moving robot may calculate the slip rate of the moving robot by an acceleration sensor for detecting the acceleration of movement of the moving robot. Therefore, the slip rate may be figured out during linear acceleration of the moving robot.

The method may further include: (d) measuring the slip rate of the moving robot by an acceleration sensor for detecting the acceleration of movement of the moving robot, when the moving robot accelerates or decelerates due to an external factor; and (e) controlling the travel of the moving robot based on the slip rate measured in the step (d). Therefore, a change in slip rate may be detected, even if the slip rate is changed due to an external factor, such as change of floor material during movement.

Advantageous Effects of Invention

Firstly, the method of controlling a moving robot according to the present invention has the advantage of controlling the travel of the moving robot which may have slip during movement by figuring out the slip rate for movement on a rotating mop.

Secondly, the method of controlling a moving robot according to the present invention has the advantage of controlling the travel of the moving robot by figuring out the slip rate for the rotation or linear acceleration of the moving robot by using a gyro sensor or acceleration sensor.

Thirdly, the method of controlling a moving robot according to the present invention has the advantage of controlling the travel of the moving robot in accordance with the situation by detecting a change in slip rate, if the moving robot accelerates or decelerates due to an external factor such as a change of floor material during movement.

BRIEF DESCRIPTION OF DRAWINGS

FIG. 1 is a perspective view of a moving robot according to an exemplary embodiment of the present invention;

FIG. 2 is a front view of a moving robot according to an exemplary embodiment of the present invention;

FIG. 3a is a view explaining how a spin mop rotates when a moving robot travels forward according to an exemplary embodiment of the present invention;

FIG. 3b is a view explaining how a spin mop rotates when a moving robot turns on a large radius according to another exemplary embodiment of the present invention;

FIG. 3c is a view explaining how a spin mop rotates when a moving robot turns on a small radius according to still another exemplary embodiment of the present invention;

FIG. 4 is a view explaining a portion of a spin mop of a moving robot that makes contact with the floor surface according to an exemplary embodiment of the present invention;

FIG. 5 is a view explaining the actual range of a spin mop involved in the movement of a moving robot according to an exemplary embodiment of the present invention;

FIG. 6 is a block diagram illustrating components associated with a controller of a moving robot according to an exemplary embodiment of the present invention;

FIG. 7 is a flowchart of a method of controlling the travel of a moving robot according to an exemplary embodiment of the present invention;

FIG. 8 is a flowchart of a method of controlling the travel of a moving robot by using a gyro sensor according to an exemplary embodiment of the present invention;

FIG. 9 is a flowchart of a method of controlling the travel of a moving robot by using an acceleration sensor according to another exemplary embodiment of the present invention; and FIG. 10 is a flowchart of a method of controlling the travel of a moving robot when the moving robot accelerates due to an external factor according to an exemplary embodiment of the present invention.

BEST MODE FOR CARRYING OUT THE INVENTION

The present disclosure and methods of accomplishing the same may be understood more readily by reference to the following detailed description of embodiments and the accompanying drawings. However, the present disclosure may be embodied in many different forms, and should not be construed as being limited to the embodiments set forth herein. Rather, these embodiments are provided so that this disclosure will be thorough and complete and will fully covey the concept of the invention to those skilled in the art, and the present disclosure will only be defined by the appended claims. Like reference numerals designate like elements throughout the specification.

Hereinafter, a method of controlling the travel of a moving robot according to exemplary embodiments of the present invention will be described with reference to the drawings.

FIG. 1 is a perspective view of a moving robot according to an exemplary embodiment of the present invention.

Referring to FIG. 1, the configuration of a moving robot according to this exemplary embodiment will be described briefly.

The moving robot 10 according to this exemplary embodiment, which performs motions by the rotation of a rotating mop, controls the travel of the moving robot 10 based on a slip rate measured with respect to a basic motion.

The moving robot 10 according to this exemplary embodiment includes a main body 20 forming the exterior appearance, a rotating mop for moving the main body 20, and a drive motor for driving the rotating mop.

The rotating mop used for the moving robot 10 according to this exemplary embodiment has a microfiber or fabric mop pad fitted in it. Thus, when the rotating mop rotates, slip occurs ? that is, the moving robot 10 does not move far relative to the actual rotation of the rotating mop. The rotating mop includes a rolling mop driven on a rotation axis parallel to the floor or a spin mop 30 driven on a rotation axis nearly perpendicular to the floor. A description will be given below of how to calculate and compensate the slip rate with respect to the spin mop 30, which is a type of rotating mop.

The moving robot 10 according to this exemplary embodiment of the present invention further includes a motion sensor for measuring the basic motion of the main body 20 when the rotating mop rotates. The motion sensor may further include a gyro sensor 110 (see FIG. 6) for detecting the rotational velocity of the moving robot 10 or an acceleration sensor 120 (see FIG. 6) for detecting the value of acceleration of the moving robot 10.

As used in this exemplary embodiment, the "basic motion" is a motion for driving the spin mop 30 of the moving robot 10 to calculate the slip rate of the moving robot 10 by using the gyro sensor 110 or acceleration sensor 120. The motion may be divided into an in-place motion in which the moving robot 10 rotates in place and a travel motion in which the moving robot 10 moves linearly or rotationally.

In the basic motion, the moving robot 10 measures the slip rate by using the gyro sensor 110 when rotating in place or in a circle. Specifically, the slip rate is measured by comparing the ideal rotational velocity of the moving robot 10 relative to the amount of rotation of the spin mop 30 with the actual rotational velocity of the moving robot 10 measured by the gyro sensor 110.

Moreover, the moving robot 10, when in the basic motion, may measure the slip rate by using the acceleration sensor 120 as the moving robot 10 accelerates or decelerates linearly. The slip rate may be measured by comparing the ideal linear acceleration of the moving robot 10 relative to the amount of rotation of the spin mop 30 with the actual acceleration of the moving robot 10 measured by the acceleration sensor 120.

As a way to measure the slip rate as above, the slip rate may be estimated using a correlation table that is created by experimentally defining the correlation between the ideal rotational velocity of the moving robot 10 relative to the amount of rotation of the spin mop 30 and the actual rotational velocity of the moving robot 10 measured by the gyro sensor 110, or the slip rate may be calculated using a slip rate formula based on the ideal rotational velocity of the moving robot 10 and the measured rotational velocity of the moving robot 10.

Likewise, when the moving robot 10 accelerates linearly, the slip rate may be estimated using a correlation table that is created by experimentally defining the correlation between the actual and ideal linear velocities of the moving robot 10, or the slip rate may be calculated using a slip rate formula based on the ideal linear velocity of the moving robot 10 and the measured linear velocity of the moving robot 10.

As used in this exemplary embodiment, the travel motion refers to every rotary motion of the spin mop 30 of the moving robot 10. Accordingly, the travel motion may include a full range of rotations in which the moving robot 10 allows the spin mop 30 to rotate in place or in a circle and a full range of movements in which the moving robot 10 linearly moves at a constant velocity, accelerates, or decelerates.

FIG. 2 is a front view of a moving robot according to an exemplary embodiment of the present invention. FIG. 3 is a view explaining motions of a moving robot according to an exemplary embodiment of the present invention. FIG. 4 is a view explaining a portion of a spin mop of a moving robot that makes contact with the floor surface according to an exemplary embodiment of the present invention. FIG. 5 is a view explaining the actual range of a spin mop involved in the movement of a moving robot according to an exemplary embodiment of the present invention.

Referring to FIGS. 2 to 5, a description will be given below of how the moving robot travels as the spin mop rotates and how to calculate and compensate the slip rate with respect to the movement of the moving robot.

The moving robot 10 according to this exemplary embodiment includes a pair of spin mops 30, and moves by rotating the pair of spin mops 30. The moving robot 10 may control the travel of the moving robot 10 by varying the direction and velocity of rotation of each of the pair of spin mops 30.

Referring to FIG. 2, in the moving robot 10 according to this exemplary embodiment, the spin mops 30 are placed at a certain angle θ0 with respect to the floor surface. The spin mops 30 are placed in such a way that the floor surface makes contact with some part of the spin mops 30 at a certain angle θ0, rather than making full contact with the entire surface of the spin mops 30.

Referring to FIG. 3a, the moving robot 10 may move linearly as the pair of spin mops 30 rotate in different directions. In this case, the pair of spin mops 30 have the same rotational velocity, but different rotational directions. The moving robot 10 may move forward or backward by changing the directions of rotation of the two spin mops 30.

Referring to FIGS. 3b and 3c, the moving robot 10 may move rotationally as the pair of spin mops 30 rotate in the same direction. The moving robot 10 may rotate in place or in a circle by varying the rotational velocity of each of the pair of spin mops 30. The radius of the circular rotation may be adjusted by varying the ratio of the rotational velocities of the pair of spin mops 30.

A description will be given below of how to calculate the slip rate of the moving robot 10. The moving robot 10 according to the present invention may measure the slip rate by driving the spin mops 30 and using the gyro sensor 110 or acceleration sensor 120. Slip rate measurement using the gyro sensor 110 will be described first, and then slip rate measurement using the acceleration sensor 120 will be described.

First of all, the slip rate measurement using the gyro sensor 110 will be described. The moving robot 10 according to the present invention may calculate the slip rate by comparing the ideal rotational velocity of the moving robot 10 with respect to the rotation of each of the spin mops 30 with the actual rotational velocity of the moving robot 10 measured by the gyro sensor 110.

The ideal rotational velocity of the moving robot 10 with respect to the rotation of each of the pair of spin mops 30 means the ideal rotational velocity of the moving robot 10 relative to the ratio of the rotational velocities of the spin mops 30 when the slip rate is 0.

The rotational velocity of the moving robot 10 depends on the radius R of the spin mops 30 and the rotational velocity of each spin mop 30. As shown in FIG. 5, if the spin mop 30 slopes down toward the floor surface, at a given angle θ1 on a virtual line connecting the centers of the pair of spin mops 30, the actual radius R' of the spin mops 30 involved in movement may be calculated as in the following Equation 1:

$$R'=R*\cos\theta 1 \qquad \text{<Equation 1>}$$

When a spin mop 30 actually travels, the part of the spin mop 30 that makes contact with the floor surface has a linear velocity V1 at the given angle θ1. Thus, a linear velocity V2 in the actual direction of travel is represented as in the following Equation 2:

$$V2=V1*\cos\theta 1 \qquad \text{<Equation 2>}$$

The actual radius R' of the spin mop 30 involved in movement corresponds to a part that is perpendicular to the linear velocity V2 in the actual direction of travel, and may be represented as in the above Equation 1.

Below is an example of calculating the slip rate of the moving robot 10 when the moving robot 10 moves rotationally or linearly.

The slip rate Sr1 for the rotational movement of the moving robot 10 according to this exemplary embodiment may be calculated as in the following Equation 3 by using the ideal rotational velocity Rf of the moving robot 10 with respect to the rotation of each of the pair of spin mops 30 and the actual rotational velocity Rr measured by the gyro sensor 110:

$$Sr1=(Rf-Rr)/Rf*100 \qquad \text{<Equation 3>}$$

The travel of the moving robot 10 may be controlled based on the slip rate calculated by the above Equation 3. By controlling the travel of the moving robot 10, the slip rate calculated by Equation 3 may be compensated as in Equation 4. Therefore, it is possible to calculate the velocity Vn (hereinafter, also referred to as "driving velocity') of the moving robot 10 to achieve a slip rate of 0 required for the moving robot 10 to travel at a desired velocity Vw.

$$Vn=Vw/((1-Sr/100)) \qquad \text{<Equation 4>}$$

The travel of the moving robot 10 may be controlled by the above Equation 4. That is, it is possible to control the travel of the moving robot 10 by figuring out the driving velocity Vn required for the moving robot 10 to have the desired travel velocity Vw by substituting the slip rate Sr calculated by the above Equation 3 into the above Equation 4.

The slip rate Sr2 for the linear movement of the moving robot 10 according to this exemplary embodiment may be calculated by using the acceleration sensor 120. The moving robot 10 according to the present invention may calculate the slip rate by comparing the ideal velocity of the moving robot 10 with respect to the rotation of each of the pair of spin mops 30 with the actual velocity of the moving robot 10 measured by the acceleration sensor 120.

The slip rate SR2 for the acceleration or deceleration of the moving robot 10 according to this exemplary embodiment may be calculated by a formula like the following Equation 5 by using the ideal velocity Vf of the moving robot 10 with respect to the rotation of each of the pair of spin mops 30 and the actual velocity Vr of the moving robot 10 measured by the acceleration sensor 120. When the moving robot 10 travels linearly, the ideal velocity Vf of the moving robot 10 may be represented by the linear velocity V2 of the spin mops 30 calculated by the above Equation 2.

The velocity Vr of the moving robot 10 measured by the acceleration sensor 120 may be calculated by integrating the value of acceleration measured by the acceleration sensor 120.

$$Sr2=(Vf-Vr)/Vf*100 \qquad \text{<Equation 5>}$$

The travel of the moving robot 10 may be controlled based on the slip rate calculated by the above Equation 5. By controlling the travel of the moving robot 10, the slip rate calculated by Equation 5 may be compensated as in Equation 4, thereby calculating the driving velocity Vn required for the moving robot 10 to travel at a desired velocity Vw.

Moreover, the slip rate may be measured by calculating the ratio of the ideal number of rotations of the spin mops and the actual number of rotations of the spin mops driven by the drive motor, within the varying angle of rotation measured by the gyro sensor.

FIG. 6 is a block diagram illustrating components associated with a controller of a moving robot according to an exemplary embodiment of the present invention. Now, the controller of the moving robot according to this exemplary embodiment will be described with reference to FIG. 6.

The moving robot 10 according to this exemplary embodiment includes a controller 100 that measures the slip rate of the moving robot 10 by the gyro sensor 110 or acceleration sensor 120 and controls the travel of the moving robot 10. The moving robot 10 according to this exemplary embodiment may further include storage 130 for storing data about slip rate measurement.

The controller 100 measures the slip rate by comparing the ideal rotational velocity of the moving robot 10 with respect to the rotation of each of the pair of spin mops 30 with the actual rotational velocity of the moving robot 10 measured by the gyro sensor 110. The controller 100 measures the slip rate by comparing the ideal linear velocity of the moving robot 10 with respect to the rotation of each of the pair of spin mops 30 with the actual linear velocity of the moving robot 10 measured by the acceleration sensor 120.

The controller 100 rotates the spin mops 30 by running the drive motor 40. The controller 100 controls the direction and velocity of rotation of each of the pair of spin mops 30 depending on the direction of travel of the moving robot 10. The controller 100 controls the travel of the moving robot 10 based on the measured slip rate. The controller 100 compensates the moving velocity of the moving robot 10 based on the measured slip rate.

The storage 130 keeps an experiment data record of the correlation between the ideal rotational velocity of the moving robot 10 relative to the amount of rotation of the spin mops 30 and the actual rotational velocity of the moving robot 10 measured by the gyro sensor 110. The storage 130 keeps an experiment data record of the correlation between the actual and ideal linear velocities of the moving robot 10, even when the moving robot 10 accelerates linearly.

If the moving robot 10 has a different slip rate for linear movement and rotational movement, the storage 130 may keep an experiment data record of the proportional relationship between the slip rate for linear movement and the slip rate for rotational movement.

FIG. 7 is a flowchart of a method of controlling the travel of a moving robot according to an exemplary embodiment of the present invention. FIG. 8 is a flowchart of a method of controlling the travel of a moving robot by using a gyro sensor according to an exemplary embodiment of the present invention. FIG. 9 is a flowchart of a method of controlling the travel of a moving robot by using an acceleration sensor according to another exemplary embodiment of the present invention. FIG. 10 is a flowchart of a method of controlling the travel of a moving robot when the moving robot accelerates due to an external factor according to an exemplary embodiment of the present invention.

Now, a method of controlling the travel of a moving robot according to this exemplary embodiment will be described with reference to FIGS. 7 to 10.

The moving robot 10 according to this exemplary embodiment undergoes the step S100 of performing a basic motion. The "basic motion" is a motion for driving the spin mops 30 of the moving robot 10 to calculate the slip rate of the moving robot 10 by using the gyro sensor 110 or acceleration sensor 120. The motion may include an inplace motion in which the moving robot 10 rotates in place and a travel motion in which the moving robot 10 moves linearly or rotationally.

The moving robot 10 may undergo the step S110 of rotational movement or the step S120 of linear acceleration.

Referring to FIG. 8, the moving robot 10 according to this exemplary embodiment undergoes the step S110 of rotational movement. The moving robot 10 rotates by rotating the pair of spin mops 30 in the same direction. The moving robot 10 may rotate in place or in a circle by varying the rotational velocity of each of the pair of spin mops 30.

Referring to FIG. 9, the moving robot 10 according to this exemplary embodiment undergoes the step S120 of acceleration. The moving robot 10 may accelerate by changing the actual rotational velocity of the spin mops 30. The moving robot 10 may accelerate by rotating the pair of spin mops 30 in different directions and changing the driving velocity of the spin mops 30.

Afterwards, the moving robot 10 undergoes the step S200 of measuring the slip rate of the moving robot 10. The slip rate is measured by using the gyro sensor 110 if the moving robot 10 moves rotationally or by using the acceleration sensor 120 if the moving robot 10 accelerates linearly.

Referring to FIG. 8, the controller 100 undergoes the step S210 of measuring the slip rate of the moving robot 10 by using the gyro sensor 110. The controller 100 measures the slip rate by comparing the ideal rotational velocity of the moving robot 10 with respect to the rotation of each of the pair of spin mops 30 with the actual rotational velocity of the moving robot 10 measured by the gyro sensor 110.

Moreover, referring to FIG. 8, after measuring the slip rate for the rotational movement of the moving robot 10, the controller 100 may undergo the step 215 of changing the measured slip rate for rotational movement to a slip rate for linear movement. The slip rate for rotational movement and the slip rate for linear movement may be different. In this case, the slip rate measured with respect to rotational movement is changed to a slip rate for linear movement, based on data about the proportional relation between the slip rate for linear movement and the slip rate for rotational movement that is stored in the storage 130.

Referring to FIG. 9, the controller 100 undergoes the step S220 of measuring the slip rate of the moving robot 10 by using the acceleration sensor 120. The controller 100 measures the slip rate by comparing the ideal velocity of the moving robot 10 with respect to the rotation of each of the pair of spin mops 30 with the actual velocity of the moving robot 10 measured by the acceleration sensor 120.

The controller 100 undergoes the step S300 of controlling the travel of the moving robot 10 by compensating the slip rate. The controller 100 may control the travel of the moving robot 10 by compensating the measured slip rate. The travel of the moving robot 10 is controlled S310 and S320 by compensating the slip rate measured with respect to the rotational movement of the moving robot 10 or the slip rate measured with respect to the linear acceleration of the moving robot 10. The controller 100 controls the travel of the moving robot 10 by figuring out the driving velocity Vn required for the moving robot 10 to have a travel velocity Vw.

The moving robot 10 according to this exemplary embodiment repeatedly performs the above process S100 to S300. By repeatedly performing the above process, the moving robot 10 updates the slip rate, which may be changed as the moving robot 10 moves, and compensates the movement of the moving robot 10. Therefore, the travel of the moving robot 10 may be controlled by repeating the above process, even if the slip rate is changed due to a change of floor material during movement of the moving robot 10.

The velocity of the moving robot 10 may be accelerated due to an external factor. In an example, if the floor material is changed during movement, the moving robot 10 may accelerate or decelerate as the force of friction between the spin mops 30 and the floor changes. The moving robot 10 may undergo the step S400 of acceleration due to an external factor such as a change of floor material, etc.

The moving robot 10 performs the step S500 of measuring the slip rate of the moving robot 10 by the acceleration sensor 120. If the moving robot 10 accelerates or decelerates due to an external factor, it estimates the current velocity from the acceleration or deceleration by the acceleration sensor 120. The controller 100 measures the slip rate by comparing the ideal velocity for the slip rate of 0 with the current velocity estimated by the acceleration sensor 120, based on the driving velocity of the drive motor 30 rotating the spin mops 30 and the radius of the spin mops 30.

Afterwards, the moving robot 10 undergoes the step S600 of controlling the travel of the moving robot 10 by compensating the travel velocity of the moving robot 10 with the measured slip rate. With the above process, the travel of the moving robot 10 may be controlled more accurately.

Although preferred embodiments of the present invention are described above with reference to the accompanying drawings, it is understood that those skilled in the art may embody the technical configuration in other specific forms without changing the technical spirits and essential features of the present invention. Therefore, it should be understood that the embodiments described above are exemplary and not restrictive in all aspects, and the scope of the present invention is defined by the appended claims rather than the above specific descriptions. It should be interpreted that all the changed and modified forms derived from the meaning, scope and equivalent concepts of the claims are included in the scope of the present invention.

The invention claimed is:

1. A method of controlling a moving robot, the method comprising:
   performing a basic motion of the moving robot, which moves on a rotating mop;
   measuring a slip rate of the moving robot; and
   controlling a travel of the moving robot by compensating for the slip rate.

2. The method of claim 1, wherein performing the basic motion of the moving robot, measuring the slip rate, and controlling the travel of the moving robot by compensating for the slip rate are repeatedly performed.

3. The method of claim 1, wherein, in performing the basic motion of the moving robot, the moving robot moves rotationally, and in measuring the slip rate, the moving robot measures the slip rate of the moving robot by a gyro sensor for detecting a rotational velocity of the moving robot.

4. The method of claim 3, wherein the slip rate is measured by using an ideal rotational velocity of the moving robot with respect to a rotation of the rotating mop and the rotational velocity of the moving robot measured by the gyro sensor.

5. The method of claim 3, further comprising changing the measured slip rate for rotational movement to a slip rate for linear movement.

6. The method of claim 1, wherein, in performing the basic motion of the moving robot, the moving robot moves rotationally, and in measuring the slip rate, the moving robot measures the slip rate of the moving robot by determining an ideal number of rotations of the rotating mop and an actual number of rotations of the rotating mop driven by a drive motor for driving the rotating mop, within a varying angle of rotation measured by a gyro sensor.

7. The method of claim 1, wherein, in performing the basic motion of the moving robot, the moving robot accelerates linearly, and, in measuring the slip rate, the moving robot calculates the slip rate of the moving robot by an acceleration sensor for detecting an acceleration of movement of the moving robot.

8. The method of claim 7, wherein the slip rate is measured by using an ideal velocity of the moving robot with respect to a rotation of the rotating mop and an actual velocity of the moving robot measured by the acceleration sensor.

9. The method of claim 1, further comprising:
   measuring the slip rate of the moving robot by an acceleration sensor for detecting an acceleration of movement of the moving robot when the moving robot accelerates or decelerates due to an external factor; and
   controlling the travel of the moving robot based on the slip rate of the moving robot measure by an acceleration sensor.

10. A method of controlling a moving robot which performs motions as a rotating mop rotates that controls a travel of the moving robot based on a slip rate measured with respect to a basic motion in which the rotating mop rotates.

11. A moving robot comprising:
    a main body forming an exterior appearance;
    a rotating mop for moving the main body;
    a drive motor for driving the rotating mop;
    a motion sensor for measuring a basic motion of the main body when the rotating mop rotates; and
    a controller that measures a slip rate by using an actual value measured with respect to the basic motion by the motion sensor and an ideal value with respect to a running of the drive motor, and that controls travel by using the slip rate.

12. The moving robot of claim 11, wherein the motion sensor comprises a gyro sensor for detecting a rotational velocity of the main body, and
    wherein the controller measures the slip rate by using a ideal rotational velocity of the main body with respect to a rotation of the rotating mop and the rotational velocity of the main body measured by the gyro sensor, and controls travel by using the slip rate.

13. The moving robot of claim 11, wherein the motion sensor comprises an acceleration sensor for detecting an acceleration of the main body, and
    wherein the controller measures the slip rate by using an ideal velocity of the main body with respect to an rotation of the rotating mop and an actual velocity of the main body measured by the acceleration sensor, and controls travel by using the slip rate.

* * * * *